(12) United States Patent
Charmot et al.

(10) Patent No.: US 6,395,850 B1
(45) Date of Patent: May 28, 2002

(54) HETEROCYCLE CONTAINING CONTROL AGENTS FOR LIVING-TYPE FREE RADICAL POLYMERIZATION

(75) Inventors: Dominique Charmot, Los Gatos; Han Ting Chang, Livermore, both of CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/862,240

(22) Filed: May 22, 2001

Related U.S. Application Data

(63) Continuation-in-part of application No. 09/676,267, filed on Sep. 28, 2000.

(51) Int. Cl.$^7$ ................................................ C08F 4/04
(52) U.S. Cl. ...................... 526/220; 526/219; 525/260; 525/261
(58) Field of Search ................. 526/220, 219; 525/260, 261

(56) References Cited

U.S. PATENT DOCUMENTS

| | | | |
|---|---|---|---|
| 3,580,830 A | 5/1971 | Siebert et al. ......... | 204/159.24 |
| 5,089,601 A | 2/1992 | Ozoe et al. ................. | 528/390 |
| 5,314,962 A | 5/1994 | Otsu et al. .................. | 525/280 |
| 5,356,947 A | 10/1994 | Ali et al. ...................... | 522/57 |

FOREIGN PATENT DOCUMENTS

| | | | |
|---|---|---|---|
| WO | 98/01478 | 1/1998 | ............. C08F/2/38 |
| WO | 98/58974 | 12/1998 | ......... C08F/293/00 |
| WO | 99/05099 | 2/1999 | ......... C07C/327/36 |
| WO | 99/31144 | 6/1999 | ............. C08F/2/38 |
| WO | 99/35177 | 7/1999 | ......... C08F/293/00 |

OTHER PUBLICATIONS

Otsu et al., 1998, Advances in Polymer Science, vol.:136, pp. 75–137. "Controlled Synthesis of Polymers Using the Iniferter Technique: Developments In Living Radical Polymerization".

Castro et al., 1984, J. Org. Chem vol. 49: 863–866 "Kinetics and Mechanism of the Additionl of Amines to Carbon Disulfide in Ethanol".

*Primary Examiner*—James J. Seidleck
*Assistant Examiner*—Olga Asinovsky

(57) ABSTRACT

Control agents that have a nitrogen—nitrogen bond in a cyclic ring covalently bonded to a thiocarbonyl moiety are provided for living-type free radical polymerization without a bimodal molecular weight distribution at high monomer conversions. These control agents provide superior properties for the production of block polymers having narrow molecular weight distributions.

20 Claims, 3 Drawing Sheets

HETEROCYCLE CONTAINING CONTROL AGENTS FOR LIVING-TYPE FREE RADICAL POLYMERIZATION

This application is a continuation in part of pending U.S. patent application Ser. No. 09/676,267, filed Sep. 28, 2000, which is incorporated herein by reference.

FIELD OF THE INVENTION

The present invention relates to new compounds useful in assisting in the polymerization of monomers in a free radical polymerization that has living-type kinetics. Polymers made with the control agents and processes for polymerization are also included.

BACKGROUND OF THE INVENTION

The use and mechanism of control agents for free radical polymerization is now generally known, see for example U.S. Pat. No. 6,153,705, WO98/01478, WO99/35177, WO99/31144, and WO98/58974, each of which is incorporated herein by reference. The compounds described in these references are generally referred to as chain transfer agents. These references generally disclose dithiocarbamate or xanthate control agents having heterocyclical moieties. See, for example, WO 99/31144 at pages 31–34.

One general problem is that at high monomer conversions (e.g., above 70%) the polymers made with these control agents have a very high molecular weight component, which leads to a polymer that generally does not have a monomodal molecular weight distribution. Without wishing to be bound by any particular theory, it is believed that this high molecular weight component is created at high conversions due to the coupling of propagating polymer chains. This coupling creates chain ends that cannot continue to be polymerized and are effectively "dead" toward further propagation. The presence of "dead" chain is particularly troubling when forming block copolymers with this controlled free radical polymerization methodology because a typical procedure for block formation uses the sequential addition of different monomers. "Dead" chains cannot participate in block formation in this methodology. Thus, there is a desire to eliminate the formation of dead chains.

With some embodiments, gel permeation chromatography experiments reveal a bimodal molecular weight distribution of the polymers made with free radical polymerization chain transfer agents of the type disclosed in these references. For example, WO 99/31144 fails to distinguish between bimodal molecular weight distributions and those that may be otherwise; consider example 22, where a bimodal distribution is revealed for control agent (62). The implication from a bimodal molecular weight distribution is that a number of dead polymer chains exist in those polymer samples.

It has now been found that certain control agents eliminate the bimodal molecular weight distribution at high conversions, additionally providing a very narrow molecular weight distribution. These control agents are particularly useful for block polymer formation using a sequential addition of monomer methodology.

SUMMARY OF THE INVENTION

This invention provides control agents that effectively diminishes or eliminates a bimodal molecular weight distribution at monomer conversions greater than 70%. These control agents also provide a polymer with a very narrow molecular weight distribution, generally less than about 1.10. In general the control agents useful to create the polymers of this invention and useful in the processes of this invention may be represented by the following general formula:

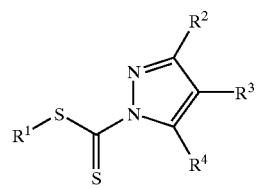

wherein $R^1$ may be selected from the group consisting of optionally substituted hydrocarbyl and heteroatom-containing hydrocarbyl and each of $R^2$, $R^3$ and $R^4$ is independently selected from the group consisting of hydride, optionally substituted hydrocarbyl and heteroatom-containing hydrocarbyl.

Other aspects of this invention include polymerization processes using these control agents and polymers that can be made with the control agents. In particular, the control agents of this invention provide living-type kinetics and as such allow for the preparation of desired products, including block polymers, star architectures, grafts and hyperbranched polymers.

Thus, it is an object of this invention to provide control agents for a living-type free radical polymerization process where the polymers made during the process do not have a bimodal molecular weight distribution at monomer conversions greater than about 70%.

It is another object of this invention to provide a system for free radical polymerization of monomers that employs living-type kinetics where the molecular weight distribution is less than about 1.10.

Further aspects and objects of this invention will be evident to those of skill in the art upon review of this specification.

DETAILED DESCRIPTION OF THE INVENTION

Figure 1:
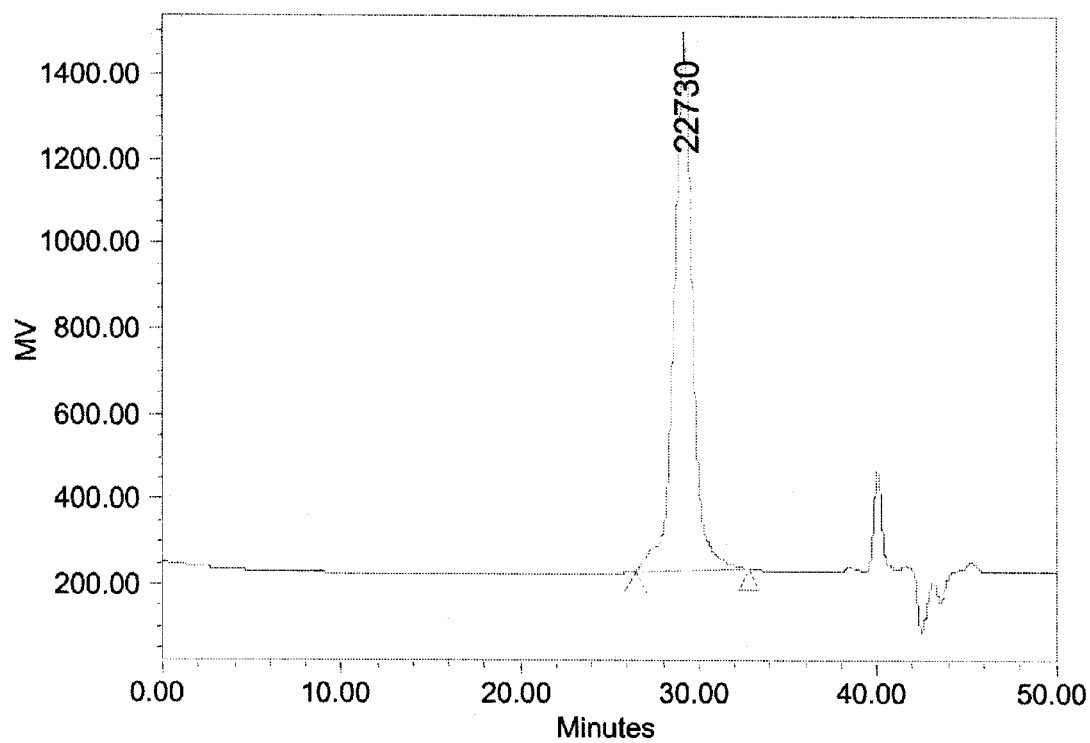
FIG. 1 is a trace from the gel permeation chromatography experiment for the polymer obtained from run 1 of Example 2.

This invention generally relates to the use of a specific class of free radical control agents that produce polymers having very narrow molecular weight distributions at high conversions. These polymers may also have a high degree of polymerization (or molecular weight), depending on the application.

In describing and claiming the present invention, the following terminology will be used in accordance with the definitions set out below. A named R group will generally have the structure that is recognized in the art as corresponding to R groups having that name. For the purposes of illustration, representative R groups as enumerated above are defined herein. These definitions are intended to supplement and illustrate, not preclude, the definitions known to those of skill in the art.

It is also to be understood that the terminology used herein is for the purpose of describing particular embodiments only, and is not intended to be limiting. As used in this specification and the appended claims, the singular forms "a," "an" and "the" include plural referents unless the context clearly dictates otherwise. In describing and claiming the present invention, the following terminology will be used in accordance with the definitions set out below.

The following definitions pertain to chemical structures, molecular segments and substituents:

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different (e.g., $R^2$ and $R^3$ in the structure of formula (1) may all be substituted alkyl groups, or $R^2$ may be hydrido and $R^3$ may be methyl, etc.).

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. The term "lower alkynyl" intends an alkynyl group of two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing one to six, more preferably one to four, carbon atoms. The term "aryloxy" is used in a similar fashion, with aryl as defined below.

The term "aryl" as used herein, and unless otherwise specified, refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine. Preferred aryl groups contain one aromatic ring or two fused or linked aromatic rings, e.g., phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl", for example, is to be interpreted as "optionally substituted alkyl, optionally substituted alkenyl and optionally substituted alkynyl."

As used herein the term "silyl" refers to the $-SiZ^1Z^2Z^3$ radical, where each of $Z^1$, $Z^2$, and $Z^3$ is independently selected from the group consisting of hydrido and optionally substituted alkyl, alkenyl, alkynyl, aryl, aralkyl, alkaryl, heterocyclic, alkoxy, aryloxy and amino.

The term "amino" is used herein to refer to the group $-NZ^1Z^2$, where each of $Z^1$ and $Z^2$ is independently selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

This invention provides control agents useful for the control of free radical polymerization reactions. In general a free radical polymerization is carried out with these control agents by creating a mixture of at least one polymerizable monomer, the control agent and optionally at least one source of free radicals, e.g., an initiator. The source of free radicals is optional because some monomers may self-initiate upon heating. After or upon forming the polymerization mixture, the mixture is subjected to polymerization conditions. Polymerization conditions are those conditions that cause the at least one monomer to form at least one polymer, as discussed herein, such as temperature, pressure, atmosphere, ratios of starting components used in the polymerization mixture, reaction time or external stimuli of the polymerization mixture.

Control Agents

Generally, the control agents useful in this invention may be characterized by the formula:

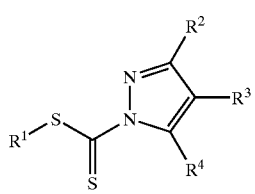

I

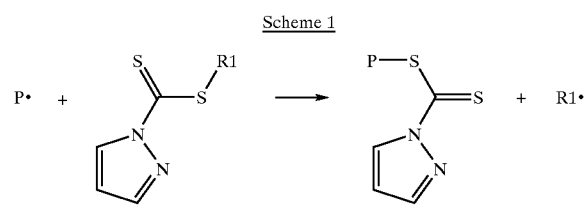

In Scheme 1, P• is a free radical, typically a macro-radical, such as polymer chain. More specifically, $R^1$ is selected from the group consisting of optionally substituted hydrocarbyl and heteroatom-containing hydrocarbyl. Even more specifically, $R^1$ is selected from the group consisting of optionally substituted alkyl, aryl, alkenyl, alkoxy, heterocyclyl, alkylthio, amino and polymer chains. And still more specifically, $R^1$ is selected from the group consisting of $-CH_2Ph$, $-CH(CH_3)CO_2CH_2CH_3$, $-CH(CO_2CH_2CH_3)_2$, $-C(CH_3)_2CN$, $-CH(Ph)CN$, $-CH(CH_3)Ph$ and $-C(CH_3)_2Ph$.

Each of $R^2$, $R^3$ and $R^4$ is independently selected from the group consisting of hydride, optionally substituted hydrocarbyl and heteroatom-containing hydrocarbyl. More specifically, $R^2$ may be selected from the group consisting of hydride, optionally substituted alkyl, aryl, alkenyl, alkynyl, aralkyl, alkoxy, heterocyclyl, alkylthio, amino and optionally substituted heteroatom-containing alkyl, aryl, alkenyl, alkynyl, and aralkyl. In some embodiments, $R^2$, $R^3$ and/or $R^4$ may be joined in a ring structure, with the ring having from 5 to 10 atoms in the backbone of the ring (including bicyclic, tricyclic or high order ring structures). For example, $R^2$ may be combined with $R^3$ and $R^3$ may be combined with $R^4$.

In other embodiments, a multifunctional control agent is used. These embodiments allow for selection of certain polymer architectures, such as stars. In these embodiments, the control agents may be represented by the general formula:

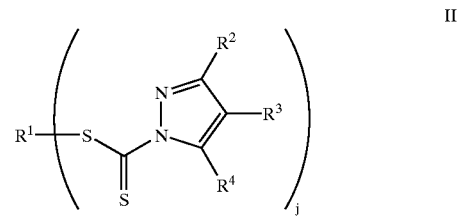

II where $R^1$, $R^2$, $R^3$ and $R^4$ each have the above definitions, with the proviso that $R^1$ is multifunctional and j is 1–12, but more specifically 1–4. For example, $R^1$ may be heteroatom containing hydrocarbyl, with an alkyl or aryl at the center, leading to structures such as:

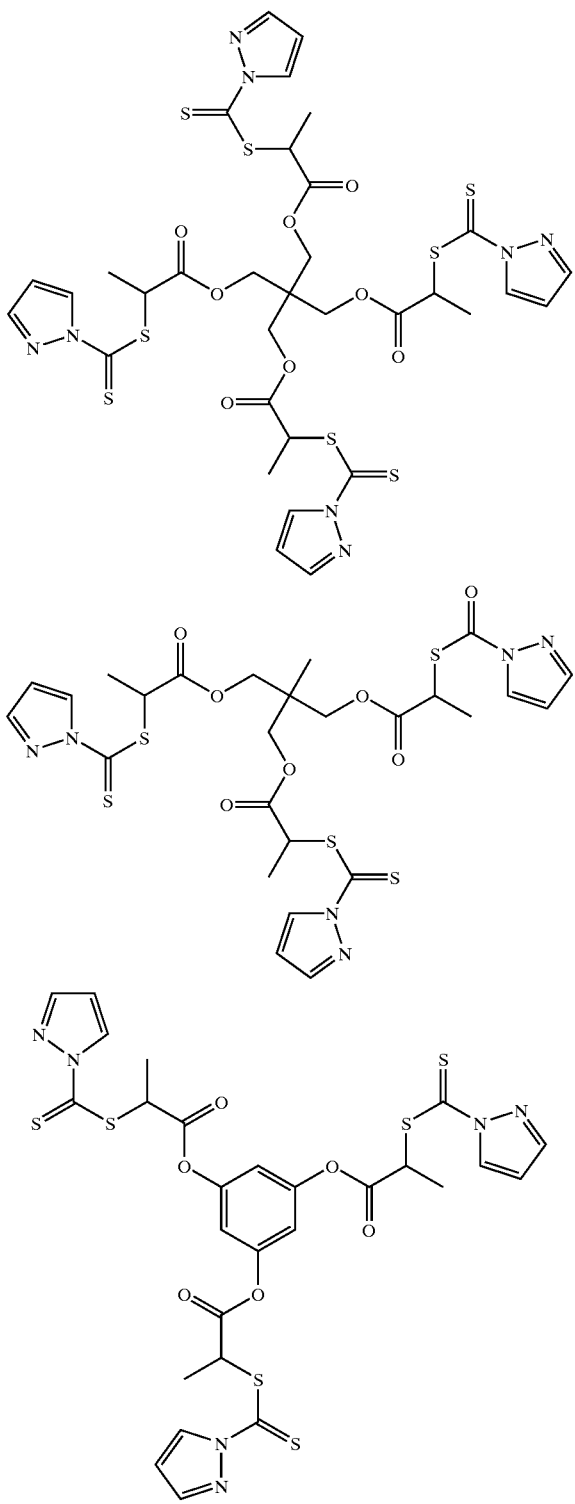

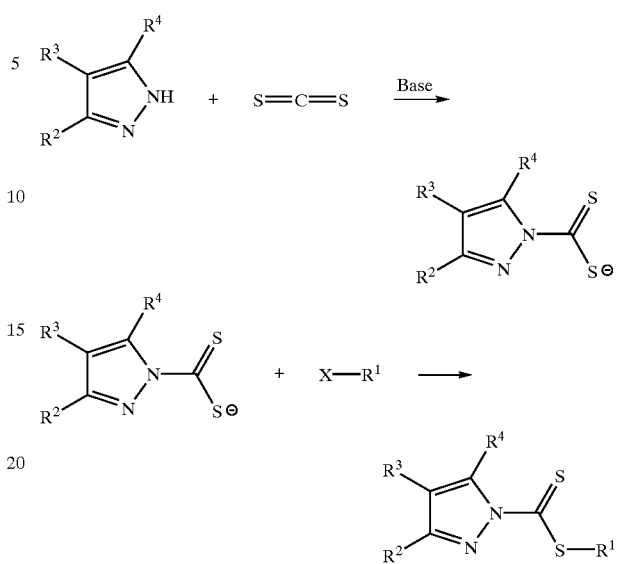

Scheme 2

The control agents of this invention are synthesized, generally, by methods known to those of skill in the art. The general synthetic approach comprises nitrogen nucleophilic addition to carbon disulfide and subsequent alkylation of the resulting dithiocarbazate with alkylhalides in a one-pot methodology, as shown in the following scheme 2:

This method is similar to those published in scientific journals, e.g., Castro et al., *J. Org. Chem.*, 1984, 49, 863, which is incorporated herein by reference.

The synthesis conditions optimized for particular nucleophiles—pyrazoles and their derivatives include: temperature in the range of 0° C. to ambient; solvents—alcohols, acetone, acetonitrile, dioxane, dimethylformamide (DMF), dimethylsulfoxide (DMSO); base—sodium hydroxide, potassium hydroxide, and sodium hydride. The optimized conditions include using sodium hydroxide as the base in DMSO at ambient temperature. The general procedure comprises starting with the pyrazole or its derivative dissolved in DMSO in approximately a 0.5–1.0 M concentration at ambient temperature. The solution is then treated with approximately 1 equivalent of NaOH and followed by addition of approximately 1 equivalent of carbon disulfide. The resulting solution is then stirred (for example, for approximately 1 hour at ambient temperature) before addition of approximately 1 equivalent of an alkylation agent. Work-up may comprise addition of water, extraction with organic solvent, and drying. The desired control agent may be purified by chromatography and/or re-crystallization and may be characterized by $^1$H NMR, $^{13}$C NMR, and GC/MS.

Polymerization Processes

The polymerization conditions that may be used include temperatures for polymerization typically in the range of from about 20° C. to about 110° C., more preferably in the range of from about 50° C. to about 90° C. and even more preferably in the range of from about 60° C. to about 80° C. The atmosphere may be controlled, with an inert atmosphere being preferred, such as nitrogen or argon. The molecular weight of the polymer is controlled via adjusting the ratio of monomer to control agent. Generally, the molar ratio of monomer to control agent is in the range of from about 5 to about 5000, more preferably in the range of from about 10 to about 2000, and most preferably from 10 to about 1500.

A free radical source is provided in the polymerization mixture, which can stem from spontaneous free radical generation upon heating or preferably from a free radical initiator. In the latter case the initiator is added to the polymerization mixture at a concentration high enough to for an acceptable polymerization rate (e.g., commercially significant conversion in a certain period of time, such as listed below). Conversely, a too high free radical initiator to control agent ratio will favor unwanted dead polymer formation through radical-radical coupling reaction leading to polymer materials with uncontrolled characteristics. The molar ratio of free radical initiator to control agent for polymerization are typically in the range of from about 2:1 to about 0.005:1. The ratios of control agent to initiator to monomer are used to target a desired degree of polymerization, which is typically about 200 or higher and more specifically about 500 or higher. Number average molecular weights of the polymers are about 20,000 or higher, and more specifically about 50,000 or higher.

Polymerization conditions also include the time for reaction, which may be from about 0.5 hours to about 72 hours, preferably in the range of from about 1 hour to about 24 hours, more preferably in the range of from about 2 hours to about 12 hours. Conversion of monomer to polymer is at least about 70%, more preferably at least about 75% and even more preferably at least about 80%. The conversion measurement is done by gas chromatography (GC) analysis based on the disappearance of monomer.

The polymerization process generally proceeds in a "living" type manner. Thus, generally an approximately linear relationship between conversion and number average molecular weight can be observed, although this is not a pre-requisite. The living character manifests itself by the ability to prepare block copolymers: hence, a polymer chain is first grown with monomer A, and then, when monomer A is depleted, monomer B is added to extend the first block of polymer A with a second block of polymer B. Block copolymer formation through a living process can be demonstrated using analytical techniques such as polymer fractionation with selective solvent (of polymer A, polymer B, respectively), gradient elution chromatography and/or 2-dimensional chromatography. Block copolymers tend to microphase-separate and organize in a variety of morphologies that can be probed by physical techniques such as X-ray diffraction, dynamic mechanical testing, and the like.

Initiators, as discussed above, may be optional. When present, initiators useful in the polymerization mixture and the inventive process are known in the art, and may be selected from the group consisting of alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include benzoylperoxide (BPO) and AIBN. The polymerization mixture may use a reaction media is typically either an organic solvent or bulk monomer or neat. Optionally, after the polymerization is over (e.g., completed or terminated) the thio-moiety (e.g., a dithio-moiety) of the control agent can be cleaved by chemical or thermal ways, if one wants to reduce the sulfur content of the polymer and prevent any problems associated with presence of the control agents chain ends, such as odor or discoloration. Typical chemical treatment includes the catalytic or stoichiometric addition of base such as a primary amine, acid or anhydride, or oxidizing agents such as hypochlorite salts.

Generally, monomers that may be polymerized using the methods of this invention (and from which M, below, may be derived) include at least one monomer is selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, butadiene, ethylene, vinyl acetate and combinations thereof. Functionalized versions of these monomers may also be used. Specific monomers or comonomers that may be used in this invention include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, 4-acryloylmorpholine, vinyl benzoic acid (all isomers), diethylaminostyrene (all isomers), α-methylvinyl benzoic acid (all isomers), diethylamino α-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, butadiene, isoprene, chloroprene, ethylene, vinyl acetate and combinations thereof.

Polymers

The polymers formed with the chain transfer agents of this invention are believed to be grown via a degenerative transfer mechanism. Thus, upon analysis of the obtained polymers, monomers might appear between the $R^1$—S bond, and any of the above formulas can be rewritten in a polymeric form. For example, the polymers of this invention may be characterized by the general formula:

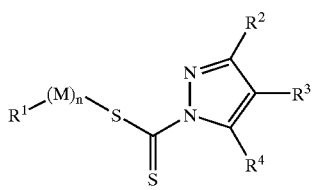

III wherein $R^1$, $R^2$, $R^3$ and $R^4$ each have the above definitions, M is a monomer or mixture of monomers or at least 2 blocks of different monomer (any from the above lists) and n is the degree of polymerization. For the multifunctional embodiments of this invention, the $(M)_n$ group appears in the same place in formula II.

Figure 2:
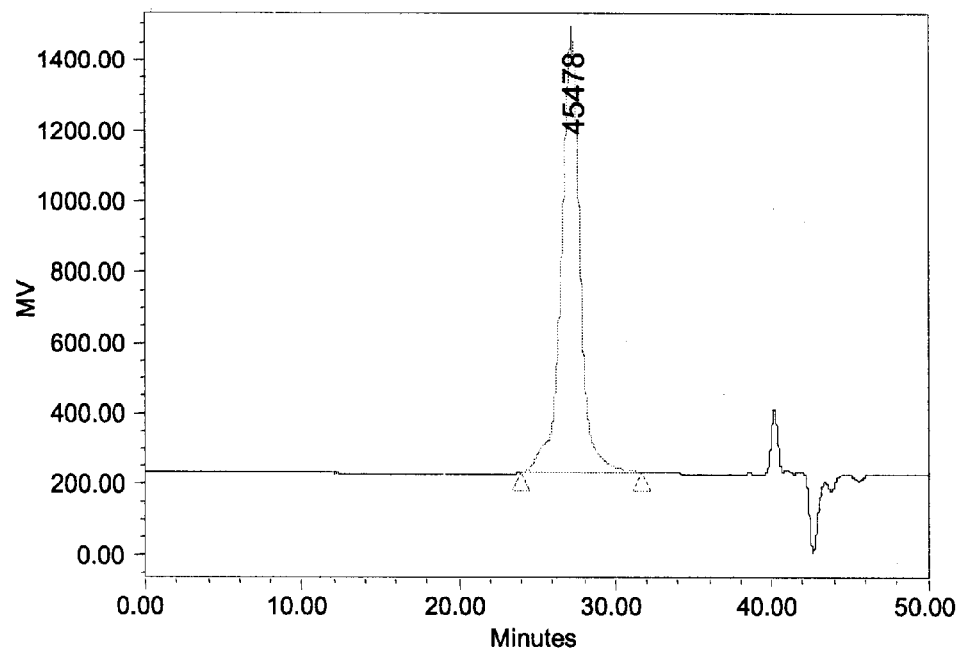
FIG. 2 is a trace from the gel permeation chromatography experiment for the polymer obtained from run 2 of Example 2.
Figure 3:
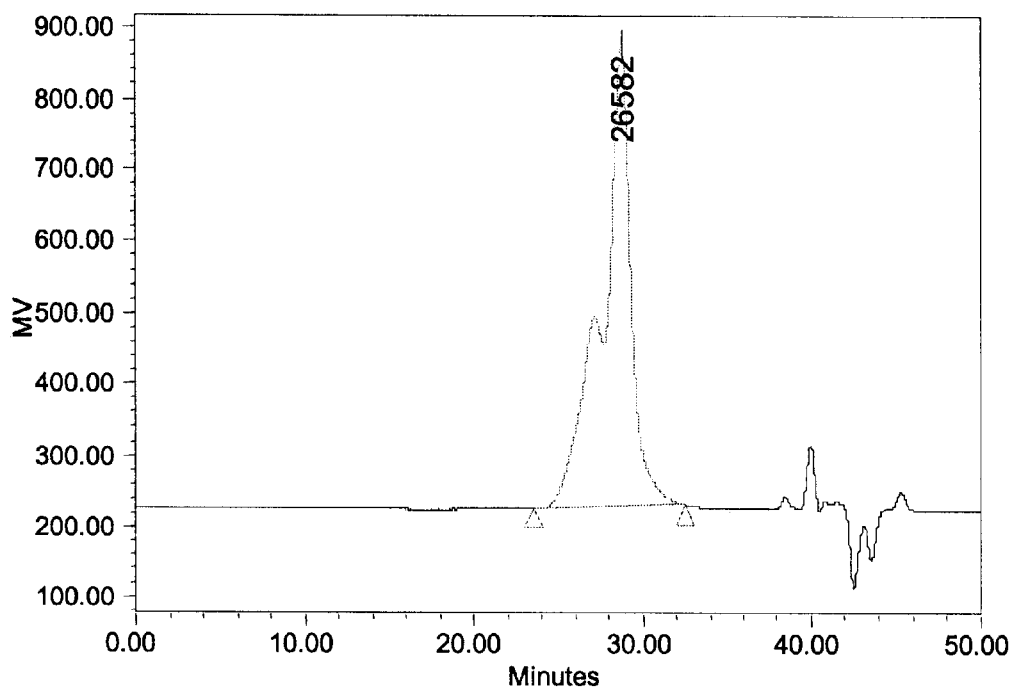
FIG. 3 is a trace from the gel permeation chromatography experiment for the polymer obtained from run 3 of Example 2.
Figure 4:
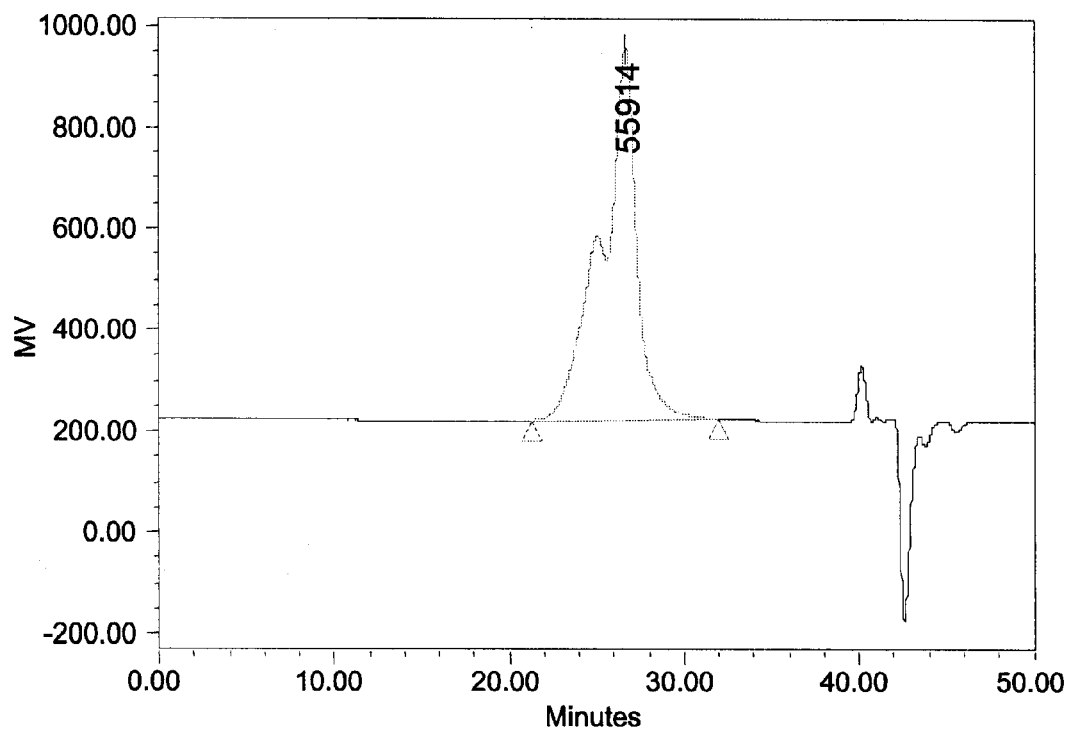
FIG. 4 is a trace from the gel permeation chromatography experiment for the polymer obtained from run 4 of Example 2.
Figure 5:
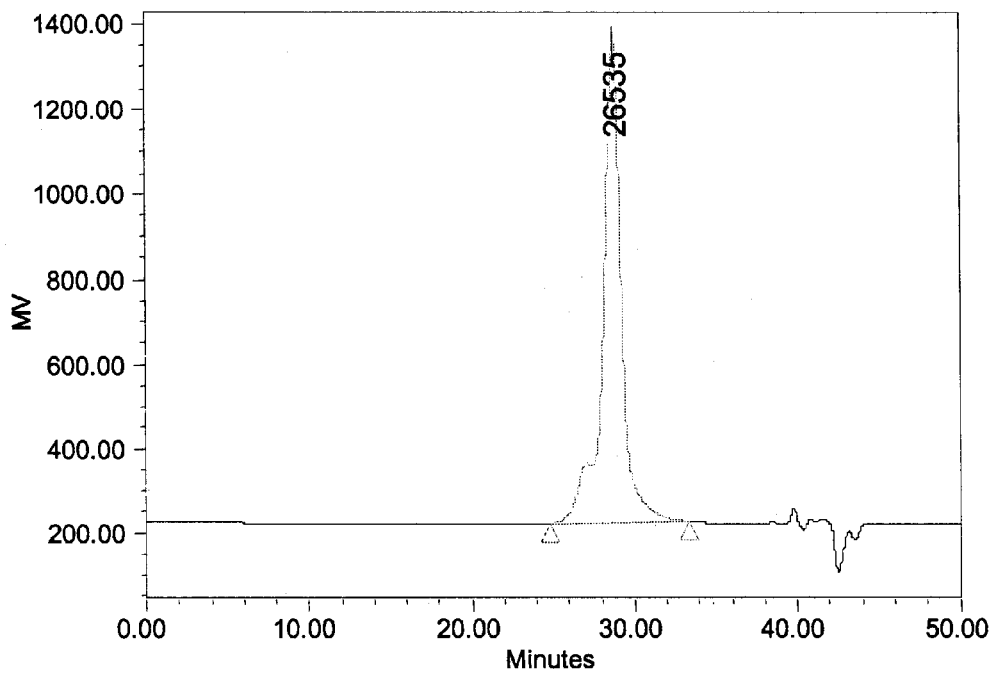
FIG. 5 is a trace from the gel permeation chromatography experiment for the polymer obtained from run 5 of Example 2.
Figure 6:
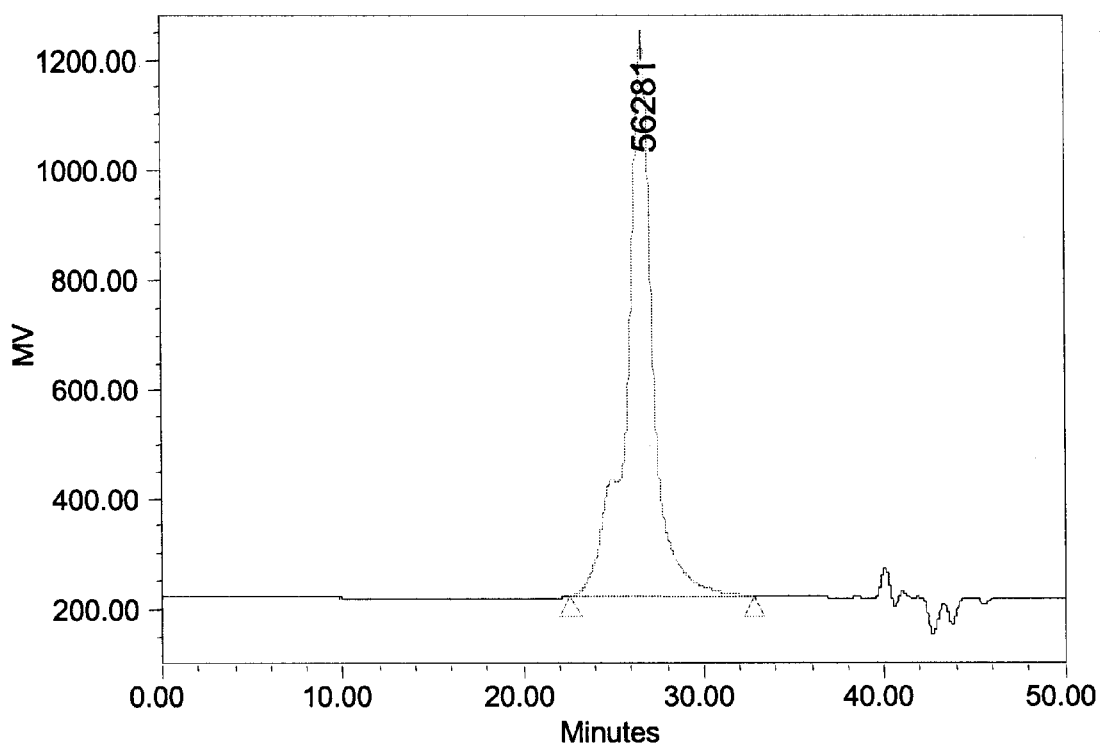
FIG. 6 is a trace from the gel permeation chromatography experiment for the polymer obtained from run 6 of Example 2.

As discussed above, the polymers of this invention have a narrow molecular weight distribution (or polydispersity index), as measured by gel permeation chromatography against polystyrene standards. The polydispersity index is less than 1.10 and more specifically less than 1.07. Moreover, the molecular weight distribution is generally mono-modal. In this context, mono-modal distributions are shown in FIGS. 1 and 2, while non-mono-modal distributions are shown in FIGS. 3, 4, 5 and 6. For purposes of this invention, the slight shoulder in FIG. 2, for example, does not remove the exemplified distribution from being considered mono-modal, and in comparison, the much more pronounced shoulder/peak in FIGS. 5 and 6 removes these exemplified distributions from being considered mono-modal, As used herein, "block copolymer" refers to a polymer comprising at least two segments of differing composition; having any one of a number of different architectures, where the monomers are not incorporated into the polymer architecture in a solely statistical or uncontrolled manner. Although there may be three, four or more monomers in a single block-type polymer architecture, it will still be referred to herein as a block copolymer. In some embodiments, the block copolymer will have an A-B architecture (with "A" and "B" representing the monomers). Other architectures included within the definition of block copolymer include A-B-A, A-B-A-B, A-B-C, A-B-C-A, A-B-C-A-B, A-B-C-B, A-B-A-C (with "C" representing a third monomer), and other combinations that will be obvious to those of skill in the art. Block copolymers can be prepared a number of ways, especially including sequential addition of monomers.

In another embodiment, the block copolymers of this invention include one or more blocks of random copolymer together with one or more blocks of single monomers. Thus, a polymer architecture of A-R, A-R-B, A-B-R, A-R-B-R-C, etc. is included herein, where R is a random block of monomers A and B or of monomers B and C. Moreover, the random block can vary in composition or size with respect to the overall block copolymer. In some embodiments, for example, the random block R will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics. Any of the monomers listed elsewhere in this specification may be used in the block copolymers of this invention.

A "block" within the scope of the block copolymers of this invention typically comprises about 10 or more monomers of a single type (with the random blocks being defined by composition and/or weight percent, as described above). In preferred embodiments, the number of monomers within a single block is about 15 or more, about 20 or more or about 50 or more. However, in an alternative embodiment, the block copolymers of this invention include blocks where a block is defined as two or more monomers that are not represented elsewhere in the copolymer. This definition is intended to encompass adding small amounts of a second monomer at one or both ends of a substantially homopolymeric polymer. In this alternative embodiment, the same copolymer architectures discussed above apply. This definition is therefore intended to include telechelic polymers, which include one or more functional end groups capable of reacting with other molecules. Thus, generally, a telechelic polymer is a block copolymer with in the definitions of this invention. The functional groups present at one or both ends of a telechelic polymer may be those known to those of skill in the art, including, for example, hydroxide, aldehyde, carboxylic acid or carboxylate, halogen, amine and the like, which have the ability to associate or form bonds with another molecule. Likewise, the block copolymers of the invention are intended to encompass telechelic polymers containing bifunctional groups, such as allyl-terminated or vinyl-terminated telechelics, sometimes referred to as macromonomers or macromers because of their ability to participate in polymerization reactions through the terminal functional group.

Combining the above embodiments provides a particularly powerful method of designing block copolymers. For example, a block copolymer may have the architecture F-A-B-F, where F represents functional groups that may be the same or different within a single F-A-B-F structure (which, therefore, may encompass F-A-B-F'). Other block copolymer architectures within the scope of this invention include A-R-B-F and F-A-R-B-F. Other architectures will be apparent to those of skill in the art upon review of this specification.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a living free radical polymerization mixture yields a block copolymer. Ideally, the growth of each block occurs to high conversion.

EXAMPLES

General: Syntheses of control agents were carried out under a nitrogen or argon atmosphere. Other chemicals were purchased from commercial sources and used as received, except for monomers, which were filtered through a short column of basic aluminium oxide to remove any inhibitor and degassed by applying vacuum. All polymerization mixtures were prepared in a glove box under a nitrogen or argon atmosphere and sealed, and polymerization was conducted at 60° C. or 70° C. Size Exclusion Chromatography was performed using automated conventional GPC system where THF was used as the mobile phase with polystyrene-based columns. All of the molecular weight results obtained are relative to linear polystyrene standards. Gas chromatography (GC) was carried out using a HP 8900 series GC.

Example 1

CONTROL AGENT SYNTHESIS

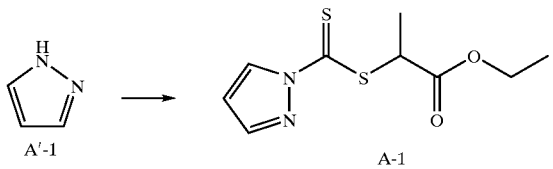

A 100 mL round-bottomed flask equipped with a magnetic stir bar and maintained under a nitrogen atmosphere was charged with pyrazole A'-1 (1.36g, 20 mmol), sodium hydroxide (0.8 g, 20 mmol), and DMSO (40 mL). The reaction mixture was kept in an ice/water bath. To the resulting solution, carbon disulfide (1.2 mL, 20 mmol) was added dropwise. The mixture was stirred for an additional one hour after the addition was finished. Ethyl 2-bromopropionate (2.6 mL, 20 mmol) was then added to the reaction mixture dropwise. After the reaction was completed, as monitored by TLC, the reaction mixture was poured into 80 mL of water and followed by extraction with ethyl acetate (2×80 mL). The organic layer was further washed with water (2×80 mL) and dried over $MgSO_4$. The solvent was removed under reduced pressure and the product was further purified by flash chromatograph. The desired control agent A-1 was obtained in 85% yield (4.15 g).

Example 2

This example provides a comparison of the control agent of example 1 in this invention and two similar control agents (shown below) that were disclosed in WO 99/31144. Control agents B-1 and B-2 were prepared in the same way as control agent A-1.

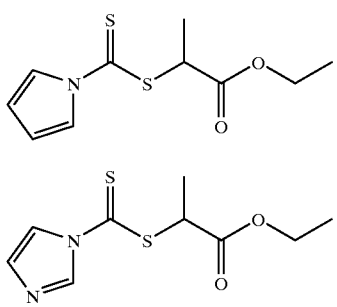

Each of the polymerizations was carried out in the same general way. n-Butyl acrylate was used as the only monomer in the amount of 3 mmol (430 uL) in all runs. 2,2'-Azobis (2-methylpropionitrile)(AIBN) was the initiator used in each polymerization in a quantity of 5 mole % relative to the control agent. Two control agent contents (0.015 mmol and 0.006 mmol) are employed to give a targeted degree of polymerization of 200 DP and 500 DP respectively. The polymerization mixture of each reaction was created by automated dispensing of reaction components at ambient temperature into a glass vial, which was then sealed. Each polymerization was carried out at 60° C. for the desired time.

The results of these polymerizations are reported in Table 1. The GPC trace of each run is shown in FIGS. 1–6.

TABLE 1

| Run | Control Agent | Targeted Degree of Polymerization | Reaction Time (h) | Conversion (%) | Mn | Mw/Mn |
|---|---|---|---|---|---|---|
| 1 | A-1 | 200 | 12 | 77 | 22407 | 1.06 |
| 2 | A-1 | 500 | 24 | 78 | 45022 | 1.08 |
| 3 | B-1 | 200 | 12 | 81 | 29812 | 1.2 |
| 4 | B-1 | 500 | 24 | 83 | 63385 | 1.26 |
| 5 | B-2 | 200 | 12 | 80 | 26247 | 1.12 |
| 6 | B-2 | 500 | 24 | 85 | 55312 | 1.19 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A method comprising (1) forming a mixture of one or more monomers, at least one free radical source and a control agent characterized by the general formula:

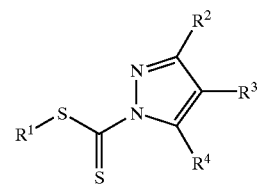

wherein $R^1$ is any group that can be expelled as its free radical form in an addition-fragmentation reaction and each of $R^2$, $R^3$ and $R^4$ is independently selected from the group consisting of hydride, optionally substituted hydrocarbyl and heteroatom-containing hydrocarbyl;

(2) subjecting said mixture to polymerization conditions to achieve a conversion of said monomers of at least 70%; and (3) recovering a polymer having a molecular weight distribution below or equal to 1.10.

2. The method of claim 1, wherein an initiator is the source of free radicals.

3. The method of claim 1, wherein the polymer has a degree of polymerization of at least about 200.

4. The method of claim 1, wherein $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains.

5. The method of claim 4, wherein $R^1$ is selected from the group consisting of —$CH_2Ph$, —$CH(CH_3)CO_2CH_2CH_3$, —$CH(CO_2CH_2CH_3)_2$, —$C(CH_3)_2CN$, —$CH(Ph)CN$, —$CH(CH_3)Ph$ and —$C(CH_3)_2Ph$.

6. The method of claim 1, wherein said polymerization conditions comprise a temperature in the range of from about 20° C. to about 110° C.

7. The method of claim 1, further wherein two or more monomers are added to said polymerization mixture and said two or more monomers are added sequentially or simultaneously.

8. The method of claim 1, wherein said polymerization conditions comprise living kinetics.

9. The method of claim 1, wherein said polymer has a mono-modal molecular weight distribution.

10. A polymer formed by the method of any of claims 1, 2 or 3.

11. The polymer of claim 9, wherein said copolymer is a block copolymer.

12. A method comprising (1) forming a mixture of one or more monomers, at least one free radical source and a control agent characterized by the general formula:

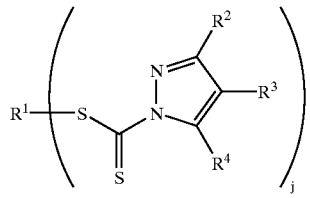

wherein $R^1$ is any group that can be expelled as its free radical form in an addition-fragmentation reaction and each of $R^2$, $R^3$ and $R^4$ is independently selected from the group consisting of hydride, optionally substituted hydrocarbyl and heteroatom-containing hydrocarbyl;

(2) subjecting said mixture to polymerization conditions to achieve a conversion of said monomers of at least 70%; and (3) recovering a polymer having a molecular weight distribution below or equal to 1.10.

13. The method of claim 12, wherein the polymer has a degree of polymerization of at least about 200.

14. The method of claim 12, wherein $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains.

15. The method of claim 12, wherein said polymerization conditions comprise a temperature in the range of from about 20° C. to about 110° C.

16. The method of claim 12, further wherein two or more monomers are added to said polymerization mixture and said two or more monomers are added sequentially or simultaneously.

17. The method of claim 12, wherein said polymerization conditions comprise living kinetics.

18. The method of claim 12, wherein said polymer has a mono-modal molecular weight distribution.

19. A polymer formed by the method of any of claims 12, 13 or 14.

20. The polymer of claim 19, wherein said copolymer is a block copolymer.

* * * * *